United States Patent [19]

Fox

[11] Patent Number: 5,061,168
[45] Date of Patent: Oct. 29, 1991

[54] MODULAR UNSCREWING MOLD APPARATUS

[76] Inventor: Alton L. Fox, 753 Klem Rd., Webster, N.Y. 14580

[21] Appl. No.: 549,808

[22] Filed: Jul. 9, 1990

[51] Int. Cl.5 ............................................. B29C 45/44
[52] U.S. Cl. .................................... 425/190; 249/59; 249/63; 264/318; 264/334; 425/556; 425/809; 425/DIG. 58
[58] Field of Search ......... 425/556, 577, 809, DIG. 5, 425/DIG. 58, 190; 264/318, 334; 249/59, 63, 64

[56] References Cited

U.S. PATENT DOCUMENTS

| | | | |
|---|---|---|---|
| 1,944,571 | 1/1934 | Rahm | 249/59 |
| 2,799,049 | 7/1957 | Wilson | 425/567 |
| 4,618,121 | 10/1986 | Conti | 249/59 |
| 4,776,782 | 10/1988 | Murayama et al. | 425/809 |

Primary Examiner—Timothy Heitbrink
Attorney, Agent, or Firm—Cumpston & Shaw

[57] ABSTRACT

A modular unscrewing injection mold and core assembly therefor includes a mold base, a core receiving opening extending through the mold base, the core assembly being removably mounted in the core receiving opening and including first and second core shells that may be secured together to receive a rotating core therebetween; a mold core rotatably mounted between the shells; a pinion gear formed on the mold core for being driven by a rack in the mold base, for rotating the mold core; the core assembly being releasably secured in the base.

26 Claims, 5 Drawing Sheets

MODULAR UNSCREWING MOLD APPARATUS

BACKGROUND OF THE INVENTION

This invention relates in general to rotating type molding apparatus, and more particularly to a modular unscrewing mold having easily removable and replaceable core assemblies, mountable in a mold base for improving the ease of maintenance and the adaptability of the mold to making articles of different sizes.

Injection molds, especially the types of injection molds used to form threaded articles, such as the plastic closures for bottles and the like, are complex and expensive mechanisms that are manufactured to tight tolerances. When in good repair, such molds can be used to form literally millions of parts per year. However, regular maintenance is required to keep the mold in operating condition. Among the components that require routine servicing are seals, O rings, bearing surfaces, and the like, that wear during normal mold operation.

Unscrewing injection molds of the type referred to above normally include a mold core rotatably mounted in a mold base, and a mold cavity mounted in a cavity retainer plate, movably mounted with respect to the mold base, for movement in a direction perpendicular to the mold base and the cavity retainer plate for bringing the mold core into close proximity to the mold cavity, so that injection molded material may be injected into the space between the core and the cavity to form the molded part.

In known molds, the mold core is rotatably mounted in the mold base by bearings, which are ordinarily press fitted into the base. Conventionally, the core is driven by a reciprocating rack, slidably mounted in the base, which rack engages the core for causing the core to rotate and unscrew from the molded article, as the cavity separates from the core. Typically, the rack is supported by bronze guides mounted in the mold base. Because the mold core is rotatably supported by a multiplicity of bearing components mounted directly in the mold base, the entire mold must normally be disassembled, in order to service or replace the mold core and/or the bearing parts. If a multi-cavity mold, having a multiplicity of mold cores, say 24, experiences damage or wear to one of the cores, the whole mold must be torn down to service the single damaged core.

Because the rotatable mold core of known molds is mounted directly in the mold base, the design of the core and the base are so closely related that the mold core cannot be replaced with a different mold core for forming a different article or a different sized article. Thus, the molds are at least substantially single purpose molds, suitable for forming only closely related parts of substantially similar sizes.

It is an object of this invention to provide modular unscrewing mold apparatus for overcoming the foregoing disadvantages and limitations of known molds. A modular unscrewing mold assembly in accordance with this invention is significantly easier to service or repair than known molds, and is substantially more versatile, having the ability to be adapted to form a wide range of moldable products of different sizes.

SUMMARY OF THE INVENTION

Briefly stated, and in accordance with a presently preferred aspect of this invention, a modular unscrewing injection mold is provided that includes a mold base; a first core assembly receiving opening extending through the mold base; and a core assembly, removably mounted in the core receiving opening. The core assembly includes first and second core shells attachable for receiving a rotating core therebetween; a mold core rotatably mounted between the first and second core shells; means on the mold core for effecting rotation of the mold core; means in the mold base engaging the means on the mold core for rotating the core; and means for releasably securing the core assembly in the mold base.

In accordance with another aspect of the present invention, the mold base is formed from first and second facing core retainer plates for receiving and securing the core assembly within the mold base.

In accordance with another aspect of this invention, the first and second core shells each includes a linear and thrust bearing assembly for rotatably supporting the core.

In accordance with still another aspect of this invention, pinion means are provided on the core, engageable with rack means slidably supported in the mold base for rotating the core.

In accordance with a still further embodiment of this invention, seals are provided in the core shells for engaging the core.

In accordance with a further aspect of this invention, modular core assemblies for an unscrewing injection mold having a core receiving opening extending through a mold base portion of the mold are provided, the core assembly comprising first and second core shells attachable for forming a core receiving space therebetween; a mold core rotatably mounted in the core receiving space formed between the first and second core shells; means on the mold core for effecting rotation of the mold core; means in the mold base engaging the means on the mold core for rotating the core; and means for releasably securing the core assembly in the mold base.

In accordance with another aspect of this invention, each of the first and second core shells includes a combined linear and thrust bearing assembly within the core receiving space for rotatably supporting the core.

In accordance with a still further embodiment of this invention, seals are provided in the core shells for engaging the core.

BRIEF DESCRIPTION OF THE DRAWINGS

While the novel aspects of the invention are set forth with particularity in the appended claims, the invention itself, together with further objects and advantages thereof may be more readily comprehended by reference to the following detailed description of a presently preferred embodiment of the invention, taken in conjunction with the accompanying drawings, in which:

DETAILED DESCRIPTION OF THE INVENTION

Figure 1:
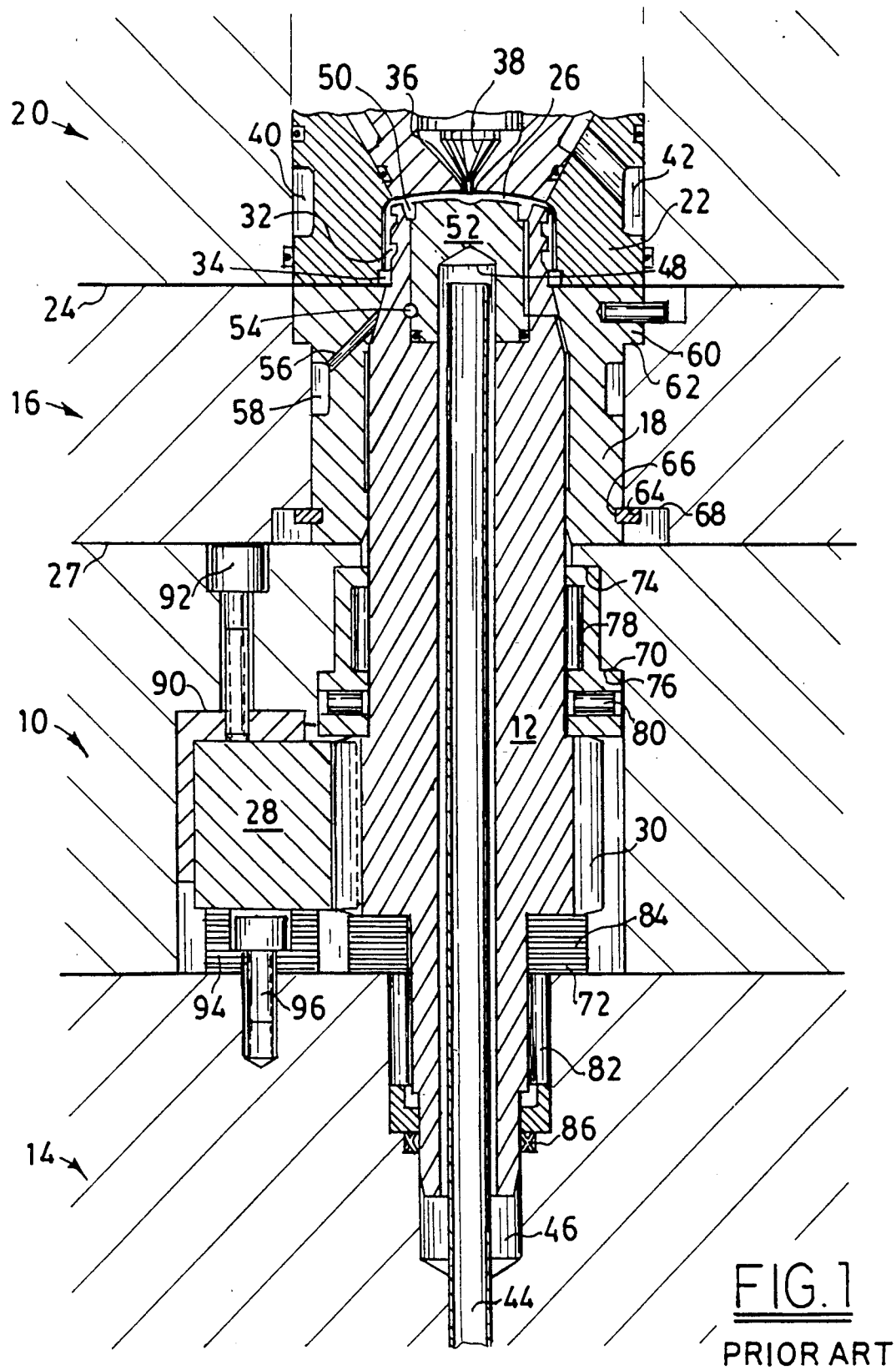
FIG. 1 is a section of an unscrewing injection mold in accordance with the prior art.

Referring now to FIG. 1, an unscrewing injection mold in accordance with the prior art is illustrated in section, taken through the operative part of a single cavity of the mold. The mold includes four large flat plates. A core retainer plate 10 supports the core 12 for rotation. A clamp plate 14 secures the core 12 in the core retainer plate 10, and provides a number of other functions that will be described in more detail below. A stripper plate 16 carries a stripper ring 18 for stripping a molded article from the core. Cavity retainer plate 20 carries mold member 22, which will be described in more detail below.

Ordinarily a production mold would include a multiplicity of assemblies of the type shown in FIG. 1, all mounted in common mold plates in a matrix or grid type arrangement. For example, the structure shown in FIG. 1 would be duplicated many times to the left and right in extensions of plates 10, 14, 16, and 20.

In operation, the cavity retainer plate 20 and stripper plate 16 separate along a first parting line 24 to open mold cavity 26, so that the molded article can be removed. Simultaneously, but at a slower rate, stripper plate 16 separates from core retainer plate 10, along second parting line 27. The cavity retainer plate and stripper plate are moved controllably by conventional screw assemblies, not shown in the figure, for simplicity.

In synchronization with the separation of stripper plate 16 and core retainer plate 10, an elongated rack 28 turns a pinion gear 30 formed on the outer periphery of cylindrical core 12 to rotate the core. The rate at which the stripper plate and core retainer plate separate to strip the molded article from the core is selected to correspond to the pitch of the interior threads 32 of the molded article, and the threads of the upper end of the core 12, so that the molded article unscrews from the end of the core 12, as the stripper plate strips the article from the core. To more effectively unscrew the molded article from the core, mating teeth are preferably provided at the inwardly extending surface of stripper ring 18, that form and engage corresponding teeth on the lower surface of the rim 34 of the molded article.

The plastic molding material is injected into the space between the mold member 22 and the upper end of core 12, through an injection nozzle 36. A heated probe 38 maintains the liquidity of the plastic material as it enters the cavity. Both the mold cavity and mold core are continuously cooled with chilled water. Water channels 40 and 42 cool the mold cavity. Bubbler tube 44 supplies cold water to an insert 52 mounted in the end of core 12, to cool the tip. The water is returned to reservoir 46 through water passage 48.

In order to mold articles with complex shapes, such as bottle caps including a seal bead 50, the insert 52 is provided in the tip of the core for venting air from the cavity during molding. Air passes through the space between the insert 52 and the core 12, through hole 54, vent 56, and air channel 58. These same elements provide the additional function of allowing air to be injected into the mold cavity to pop or blow the molded article off the core.

The various elements of the mold thus far described are firmly secured in the plates to maintain close tolerances therebetween. Stripper ring 18 is press fitted into stripper plate 16, from the top as shown in FIG. 1. A shoulder 60 on the stripper ring engages an inwardly projecting surface 62 on the stripper plate. A snap ring 64 seats within a groove 66, in the stripper ring, and engages surface 68 cut in the opposite surface of the stripper plate. Thus, while the snap ring 64 can be removed and the stripper ring 18 pressed out of the stripper plate 16 if it needs to be serviced or replaced, it will be apparent that the mold must be disassembled to accomplish this.

The core is supported by bearing assemblies 70 and 72, that are pressed into the core retaining plate and clamp plate respectively. Bearing assembly 70 is pressed in from the bottom (as shown in FIG. 1) of core retainer plate 10, and is positioned by shoulders 74 and 76. Linear bearing portion 78 of bearing assembly 70 bears against the outer cylindrical surface of the core 12, while thrust bearing assembly 80 bears against the upper surface of pinion 30. A substantially similar lower bearing assembly 72 supports the lower end of core 12, and includes linear bearing portion 82 that engages the lower outside surface of the core 12 and thrust bearing portion 84 that engages the lower surface of pinion 30. A quad ring seal 86 engages the core 12 and prevents cooling water from entering bearing assembly 72.

Rack 28 is supported by an L-shaped wear bronze 88, which is secured to a shoulder 90 of core retainer plate 10, by a conventional fastener such as bolt 92. A lower wear bronze 94 is secured to clamp plate 14 by bolt 96. Rack 28 is slidably supported on the two wear bronze bearings. The wear bronze elements 88 and 94 need routine replacement, as they wear due to friction between them and rack 28. Replacing the wear bronzes requires substantially complete disassembly of the mold, particularly, disassembling the clamp plate from the core retainer plate.

The foregoing prior art cavity mold assembly construction has been used for many years. However, it is difficult to maintain and service, requiring substantially complete disassembly of the mold to repair and refit wearable items. The present invention addresses these problems by providing a new mold construction employing a modular core assembly that contains essentially all of the parts that need regular maintenance, in one removable and easily replaceable unit.

Further, as will be appreciated from the discussion of the prior art construction as shown in FIG. 1, the mold plates, particularly the core retainer plate and bottom clamp plate, must be machined to close tolerances. If the plates themselves wear or are damaged, it may be necessary to discard or rebuild them at a very significant cost. The present invention substantially eliminates the critical tolerances on the plates themselves by shifting the critical dimensions to the removable core assembly.

Figure 2:
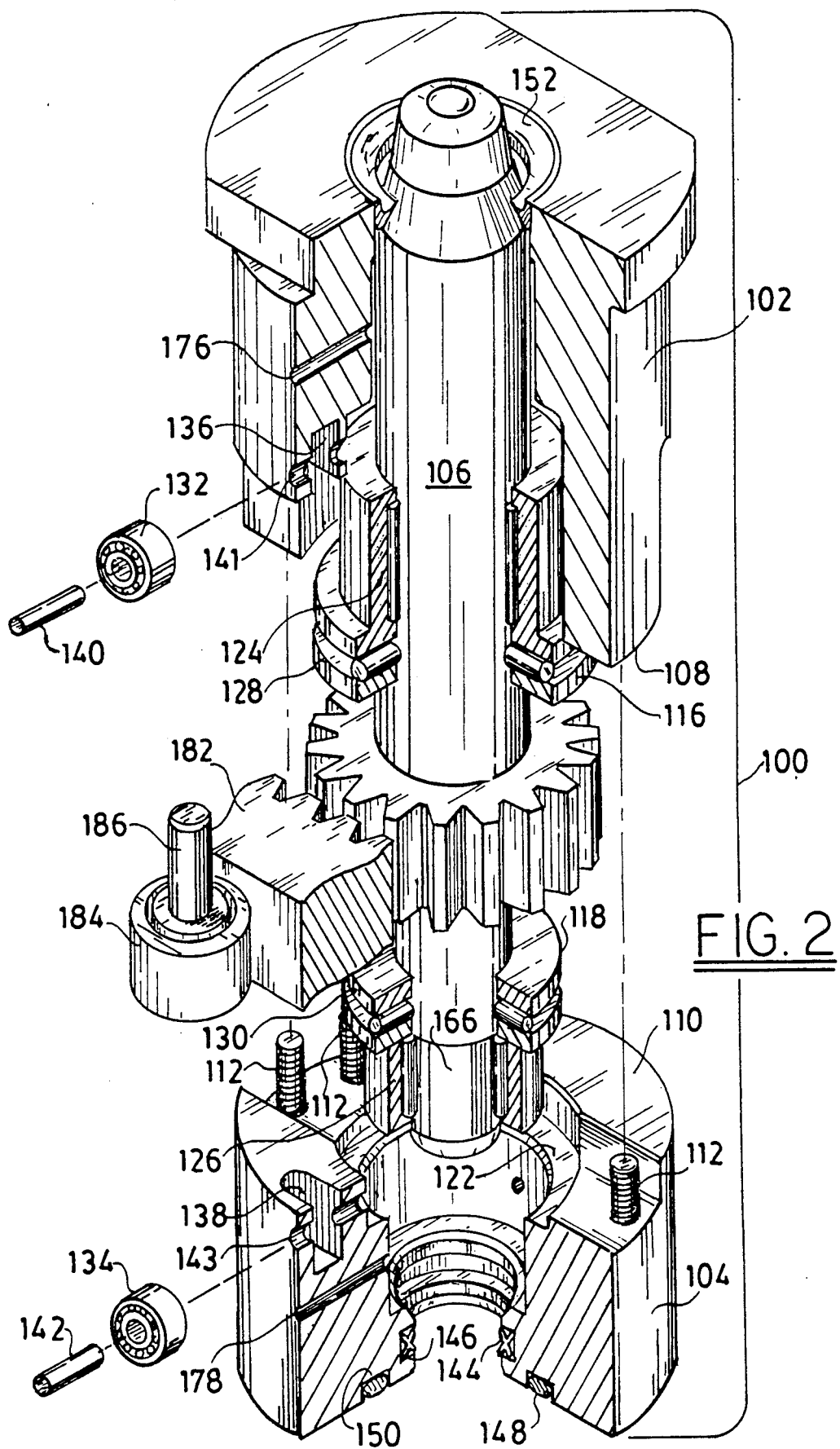
FIG. 2 is an exploded perspective view of a core assembly for a modular unscrewing mold in accordance with the present invention.
Figure 3:
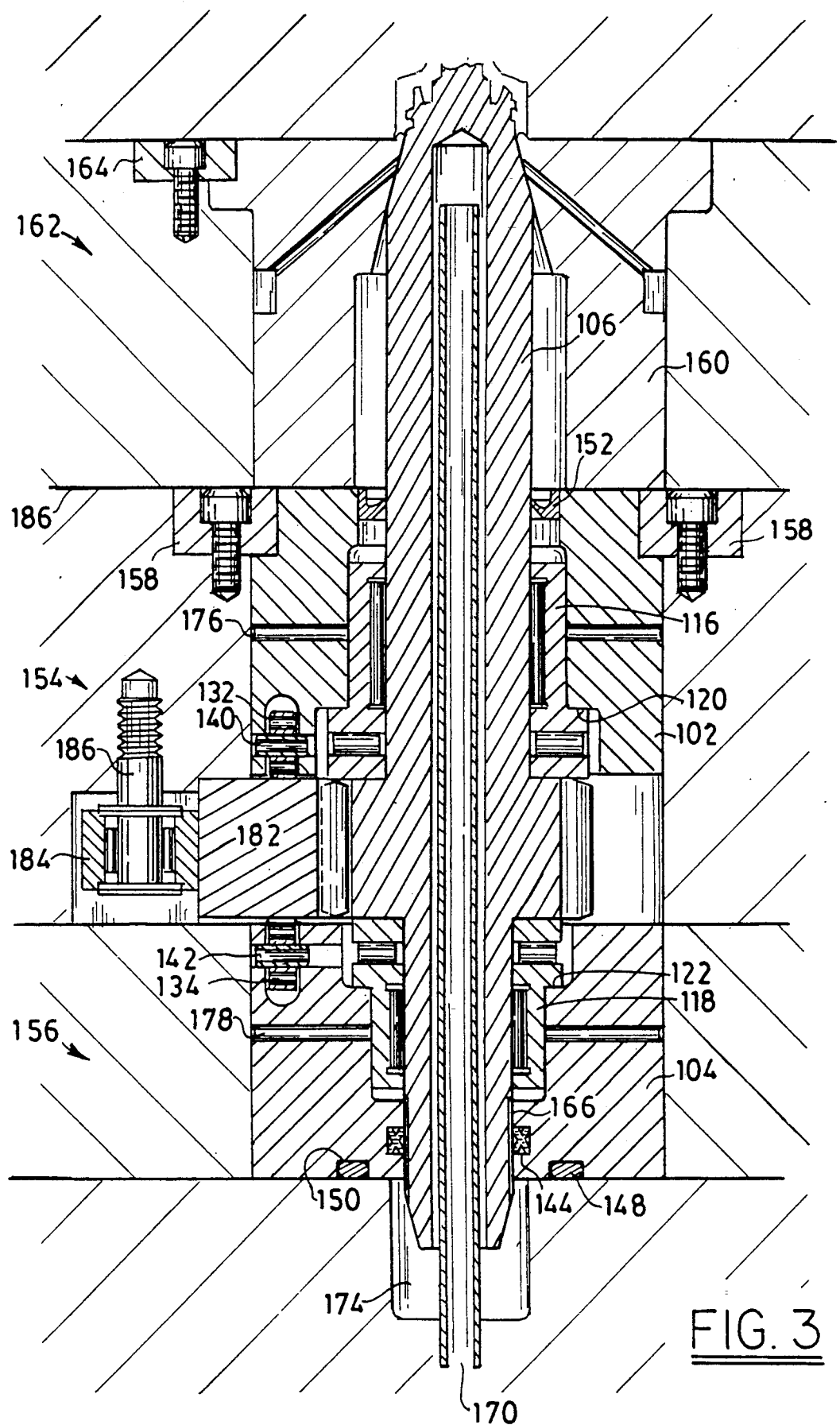
FIG. 3 is a section of a modular unscrewing injection mold in accordance with this invention.
Figure 4:
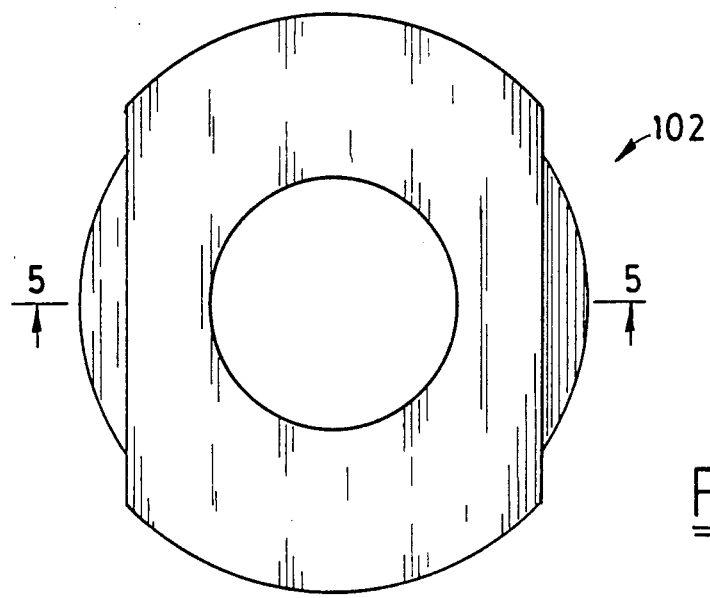
FIG. 4 is a top plan view of a first core shell in accordance with this invention.
Figure 5:
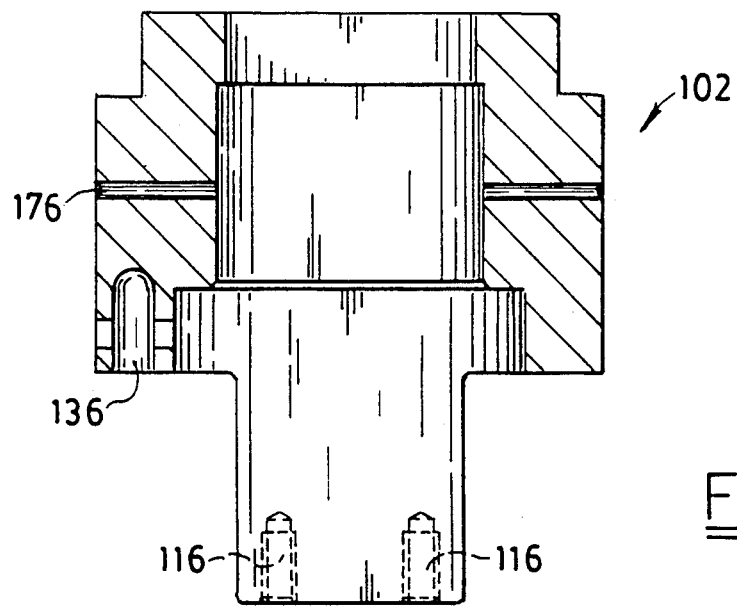
FIG. 5 is a section view taken along lines 5—5 of the core shell of FIG. 4.
Figure 6:
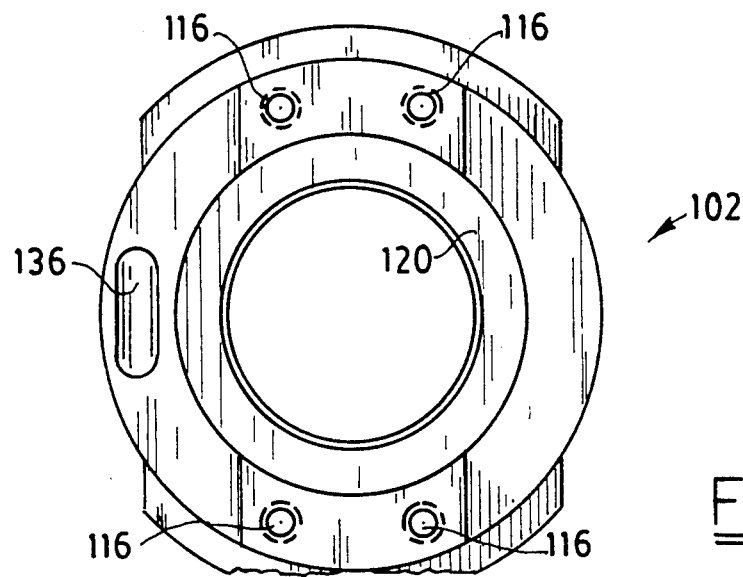
FIG. 6 is a bottom plan view of the core shell of FIG. 4.
Figure 7:
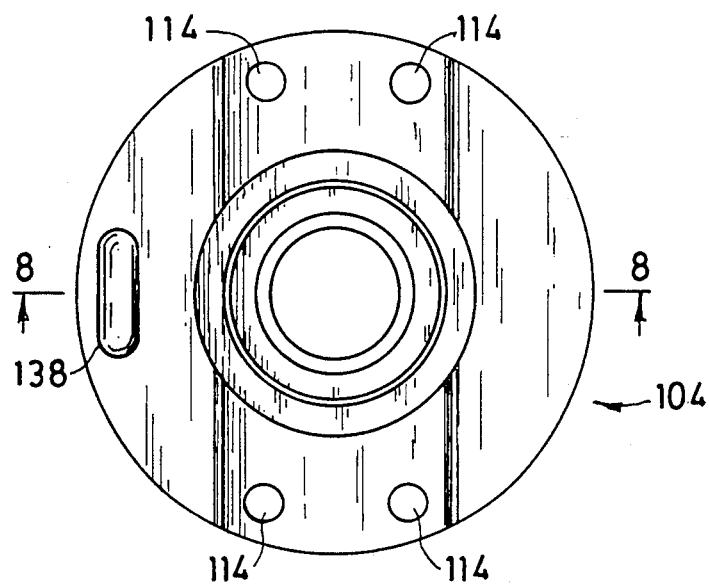
FIG. 7 is a top plan view of a second core shell in accordance with this invention.
Figure 8:
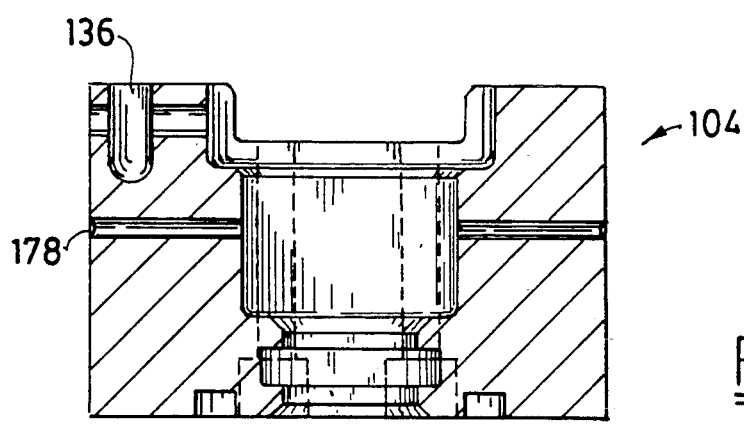
FIG. 8 is a section view taken along lines 8—8 of FIG. 7.
Figure 9:
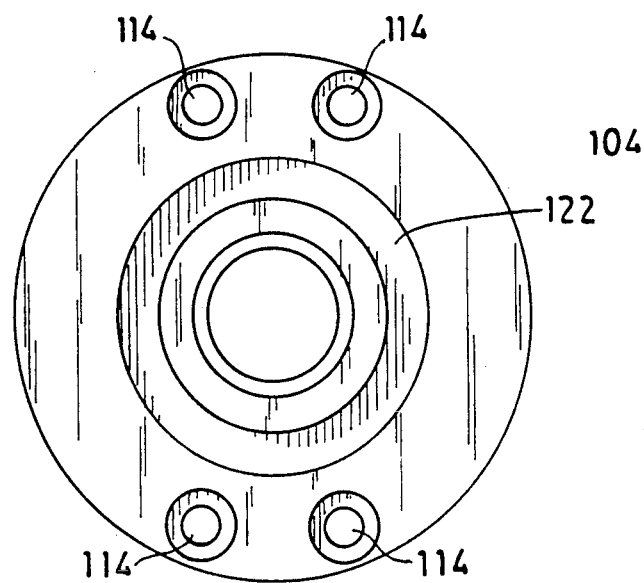
FIG. 9 is a bottom plan view of the second core shell of FIGS. 7 and 8.

Referring now to FIGS. 2 and 3, a modular unscrewing cavity mold in accordance with this invention is illustrated. A core assembly 100 is shown in an exploded perspective view in FIG. 2. The assembly includes first and second core shells 102 and 104, having mating and interengaging facing stepped surfaces 108 and 110 respectively. The surfaces at least generally resemble a tongue and groove joint. Four bolts (three of which are visible in FIG. 2) 112 secure the core shells together. The bolts pass through through holes 114 in core shell 104, as shown in FIGS. 7 through 9. The ends of the bolts 112 engage threaded blind bores 116 in core shell 102, as can be readily seen in FIGS. 5 and 6. The bolts 112 secure the core shell segments securely together. Core 106 is supported within the core shells by bearing assemblies 117 and 118 installed in shells 102 and 104 respectively. The bearing assemblies are pressed into the core shells, and located longitudinally by mounting surfaces 120 and 122 on the core shells 102 and 104 respectively. Each of the bearing assemblies includes linear bearing portion 124, 126 and a thrust bearing portion 128, 130 respectively. Rack bearings 132 and 134 are supported in cavities 136 and 138 by spindles 140 and 142, which are preferably press fit into bores 141 and 143 of core shells 102 and 104 respectively. A quad ring seal 144 is inserted into an annular groove 146 in core shell 104, and an O ring seal 148 is placed in a groove 150 in core shell 104. Shaft seal 152 is installed at the upper end of core shell 102. The partially assembled core shells are then pressed over core 106, one from each side, to form core assembly 100 as most clearly seen in FIG. 3. Once bolts 112 are tightened, the core shells and core form an integral core assembly, that can be easily installed in an inexpensive straight bore through core retainer plate 154, and core retainer plate 156 as seen in FIG. 3. Preferably, a key 158 removably secures the core assembly within the bore. Similarly, stripper ring 160 is retained in stripper plate 162 by capscrew 164. Since there is essentially no force tending to urge the stripper ring out of the stripper plate, a relatively small fastener will secure it.

In order to enhance the maintainability of the core assembly, a number of additional features have been added. A wear sleeve 166 is disposed around core 106 in a shallow groove 168 on the bottom end of the core 106, where seal 144 engages the core. The replaceable wear sleeve extends the life of the core by permitting wear caused by seal 144 to be repaired without replacing the core. Preferably a thin stainless steel sleeve is employed. The core assembly also includes a generally conventional bubbler tube 170 for cooling the core, and a reservoir 174 that collects warmed water exiting from the core. The bearing assemblies 117 and 118 are lubricated by oil fed to them through oil grooves 176 and 178. Although the core 106 includes a pinion gear 180, that is rotated with a rack 182 as in the prior art, the rack is mounted in a substantially different fashion in accordance with the present invention. The rack is supported by bearings 132 and 134, which are mounted in the first and second core shells respectively, as already described. Further, the bearing is maintained in engagement with the pinion teeth, by roller bearing 184 which is secured on a shaft 186, which is threaded into core retainer plate 154, as may be most clearly seen in FIG. 3.

It will be appreciated by reference to FIGS. 1 and 3 that maintenance of a modular unscrewing injection mold in accordance with this invention is substantially simpler than was previously the case. In the mold of the present invention, by moving the stripper plate to an open position, separated from the core retainer plate 154 along line 186, the key or keys 158 may be removed, the rack 182 withdrawn, and the core assembly 100 lifted, together with the core, out of the core retainer plates 154 and 156. The entire core assembly may be replaced with a refurbished core assembly, and the mold rapidly placed back into service. The teardown of the molding machine required to accomplish this same maintenance in prior art machines is completely eliminated.

It will also be appreciated that the present invention permits substantially enhanced versatility in multicavity molds. It is relatively simple to convert a mold from one size cavity to another, simply by replacing the core assembly, stripper rings, and mold cavity in each mold segment. This can be done without the need for modifying the mold itself, and thus provides substantially enhanced versatility over existing molds.

While the invention has been shown and described in conjunction with a presently preferred embodiment thereof, those skilled in the art will recognize that many modifications and changes may be made therein, without departing from the true spirit and scope of the invention, which accordingly is intended to be defined solely by the appended claims.

What is claimed is:

1. A modular unscrewing injection mold comprising:
a mold base;
a first core receiving opening extending through the mold base;
a core assembly, removably mountable as a unit in the core receiving opening, the core assembly comprising:
a first core shell; and
a second core shell attached to the first core shell and forming a core receiving space therebetween;
a mold core rotatably mounted in the core receiving space of the core assembly;
means on the mold core for effecting rotation of the mold core;
means in the mold base, engaging the means on the mold core, for rotating the core;
means for releasably securing the core assembly in the mold base.

2. The modular unscrewing injection mold of claim 1 in which said mold base comprises:
a first core retainer plate;
a second core retainer plate; and
a bottom clamp plate, arranged in layered adjacent relationship with the second core retainer plate disposed between the clamp plate and the first core retainer plate.

3. The modular unscrewing injection mold of claim 1 in which the fire core shell comprises bearing means for rotatably supporting the core.

4. The modular unscrewing injection mold of claim 1 in which the second core shell comprises bearing means for rotatably supporting the core.

5. The modular unscrewing injection mold of claim 1 in which the means on the mold core for effecting rotation of the mold core comprises pinion means.

6. The modular unscrewing injection mold of claim 5 in which the means in the mold base engaging the means on the mold core for rotating the core comprises rack means slidably mounted in the base.

7. The modular unscrewing injection mold of claim 6 in which the first core shell comprises first bearing means for engaging and slidably supporting the rack means.

8. The modular unscrewing injection mold of claim 7 in which the second core shell further comprises second bearing means for engaging and slidably supporting the rack means.

9. The modular unscrewing injection mold of claim 1 in which the first core shell comprises a shaft seal means for engaging and sealing the core.

10. The modular unscrewing injection mold of claim 9 in which the second core shell comprises shaft seal means for engaging and sealing the the mold core.

11. The modular unscrewing injection mold of claim 1 further comprising a stripper plate movably connected to the mold base for movement in a direction perpendicular to the mold base.

12. The modular unscrewing injection mold of claim 1 in which the mold core comprises a threaded article forming end.

13. The modular unscrewing injection mold of claim 11 further comprising separator means for moving the stripper plate relative to the mold base for ejecting a molded article from the core.

14. The modular unscrewing injection mold of claim 3 in which the bearing means comprises combination thrust and linear bearing means for supporting the core.

15. The modular unscrewing injection mold of claim 4 in which the bearing means comprises combination thrust and linear bearing means for supporting the core.

16. A removable, replaceable modular injection mold insert for mounting in a mold base of an injection mold, comprising a core assembly removably mountable as a unit in an opening in the mold base, the core assembly comprising:
   a first core shell;
   a second core shell attached to the first core shell and forming a core receiving space therebetween;
   a mold core rotatably mounted in the core receiving space of the core assembly; and
   means on the mold core engageable with corresponding means in the mold base for cooperatively effecting rotation of the mold core.

17. The modular injection mold insert of claim 16 in which the first core shell comprises core supporting bearing means for supporting the core.

18. The modular injection mold insert of claim 16 in which the second core shell comprises core supporting bearing means for supporting the core.

19. The modular injection mold insert of claim 16 in which the means on the mold core for effecting rotation of the mold core comprises pinion means.

20. The modular unscrewing injection mold of claim 19 in which the means in the mold base engaging the means on the mold core for rotating the core comprises rack means slidably mounted in the base.

21. The modular injection mold insert of claim 20 in which the first core shell comprises bearing means for engaging and supporting the rack means.

22. The modular injection mold insert of claim 20 in which the second core shell further comprises bearing means engaging the means for effecting rotation of the mold core.

23. The modular injection mold insert of claim 16 in which the first core shell comprises a shaft seal means for engaging and sealing the core.

24. The modular injection mold insert of claim 16 in which the second core shell comprises shaft seal means for engaging and sealing the mold core.

25. The modular injection mold insert of claim 16 in which the bearing means comprises combination thrush and linear bearing means for supporting the core.

26. The modular injection mold insert of claim 16 in which the bearing means comprises combination thrust and linear bearing means for supporting the core.

* * * * *